United States Patent
Koyamatsu et al.

Patent Number: 5,272,932
Date of Patent: Dec. 28, 1993

[54] TORSIONAL DEVICE FOR REMOTE CONTROL STEERING SYSTEM

[75] Inventors: Anthony H. Koyamatsu, Kaneohe; Owen T. Ono, Waimanalo; Warren L. Hahn, Waipahu, all of Hi.

[73] Assignee: The United States of America as represented by the Secretary of the Navy

[21] Appl. No.: 892,057

[22] Filed: May 28, 1992

[51] Int. Cl.$^5$ .................. B62D 1/16; F16D 3/76
[52] U.S. Cl. ......................... 74/492; 464/89
[58] Field of Search ............... 74/492; 267/150; 464/81, 82, 83, 89

[56] References Cited

U.S. PATENT DOCUMENTS

| | | |
|---|---|---|
| 2,534,621 | 12/1950 | Panhard . |
| 3,459,063 | 8/1969 | Numazawa ............... 74/492 |
| 3,466,896 | 9/1969 | Pfarrwaller ............... 464/91 |
| 3,731,500 | 5/1973 | Schlums ............... 464/83 X |
| 3,878,695 | 4/1975 | Pitner . |
| 4,012,923 | 3/1977 | Lundgren ............... 464/83 |
| 4,269,043 | 5/1981 | Kizu et al. ............... 74/492 X |
| 4,406,640 | 9/1983 | Flanklin et al. ............... 464/89 X |
| 4,479,786 | 10/1984 | DeBisschop ............... 72/492 X |
| 4,531,719 | 7/1985 | Hoppie et al. . |
| 4,573,936 | 3/1986 | Wolf . |
| 4,597,567 | 7/1986 | Racca . |
| 4,744,677 | 5/1988 | Tanaka et al. . |
| 4,984,776 | 1/1991 | Smith . |
| 5,000,430 | 3/1991 | Smith . |
| 5,086,661 | 2/1992 | Hancock . |

Primary Examiner—Allan D. Herrmann
Assistant Examiner—David W. Laub
Attorney, Agent, or Firm—Harvey Fendelman; Thomas Glenn Keough; Peter A. Lipovsky

[57] ABSTRACT

A steering simulation device provides torsional resistance and a "center return" function to a remote control steering mechanism experiencing bidirectional (clockwise or counterclockwise) rotational movement. A compact design is provided by utilizing a series of rotationally elastic couplings that permit (1) an adjustable turning resistance, (torsional resistance), (2) an adjustable, bidirectional rotary range (clockwise or counterclockwise), and (3) a self-centering capability.

7 Claims, 2 Drawing Sheets

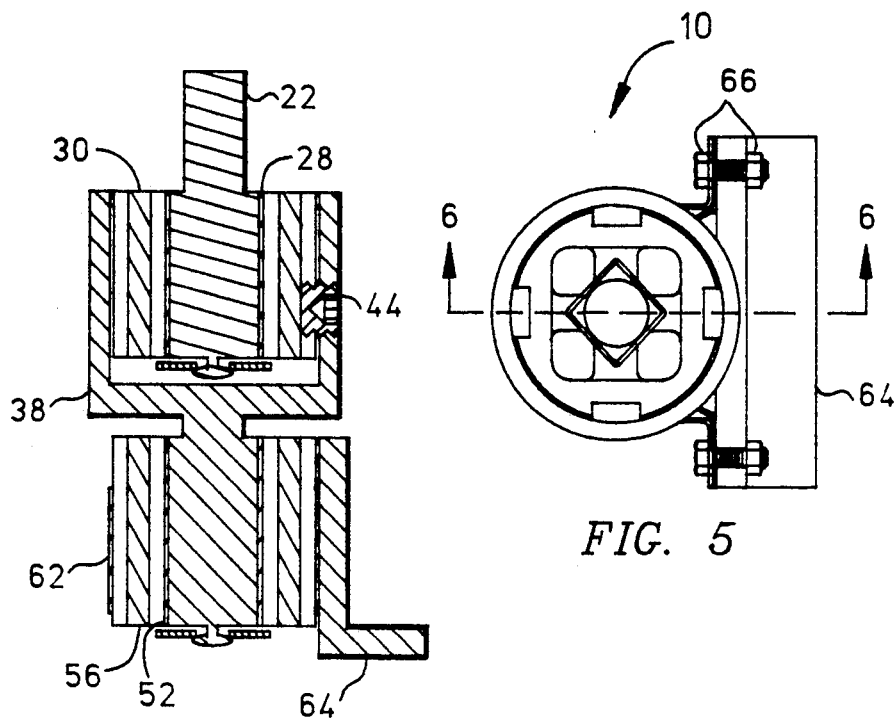
FIG. 5
FIG. 6
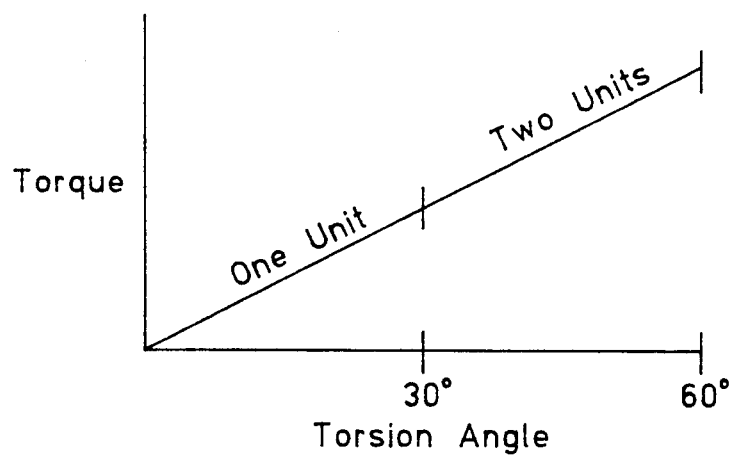
FIG. 7

TORSIONAL DEVICE FOR REMOTE CONTROL STEERING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates generally to an apparatus that exerts torsional resistance upon a clockwise or counterclockwise rotating object. More particularly, but without limitation thereto, the invention relates to a steering system for remotely controlling an object and in particular an apparatus that simulates realistic steering feel in a remote control steering system by providing torsional resistance and a "center return" feature.

2. Description of the Related Art

Steering devices associated with remote vehicle control provide two basic forms of bidirectional (clockwise and counterclockwise) torsional resistance to steering motion. In FIG. 1 the first of these methods is shown in which a pair of counteracting springs act upon the rotational axis of a remote control steering column. A common mode of failure of this system is the breaking of the cable attaching the springs to the steering column. The cable is prone to corrosion and is frequently stretched over a small radius precipitating cable fraying and eventual breakage. Cable replacement can be difficult as the utilized springs are often required to be prestressed or stretched before cable attachment.

In this system the size of the springs and length of the accompanying cable can take up a considerable amount of space depending upon the amount of pressure/resistance and rotational range required of the steering column.

In a second method air-filled pistons are used instead of springs. This method, shown in FIG. 2, uses the counteracting pistons to provide torsional resistance and self-centering capability to simulate driving feel. The air-filled pistons may require pressurization to create a preload and, of course, can be prone to leakage. Typically such air-filled pistons require a considerable amount of space.

SUMMARY OF THE INVENTION

The invention provides torsional resistance and a "center return" function for a mechanism experiencing bidirectional (clockwise or counterclockwise) rotational movement. It does this through rotationally elastic couplings that may be used in singular or plural configurations. The design of the invention is compact and can therefore be applied to a variety of applications. These may include the steering grasp or wheel of a remote vehicle control system or the steering mechanism of a video game, for example. The invention could also be applied in other applications requiring rotational torsional resistance and a "center return" feature, such as exercise machines and swinging door hinges.

The compact torsional device of the invention allows these mechanisms to have (1) an adjustable turning resistance, (torsional resistance), (2) an adjustable, bidirectional rotary range (clockwise or counterclockwise), and (3) a self-centering capability. For steering applications, it is a purpose of this invention to replicate the steering feel of an actual steering system while maintaining a small overall profile.

This turning feel is replicated by offering an operator progressive turning resistance as he increases the rotation of the device of the invention and by offering a center return function that brings the device back to a centered position from a rotated position. This center return feature is of particular importance to an operator of a remote vehicle as it provides the operator with a reference to assist his steering orientation.

OBJECTS OF THE INVENTION

It is an object of the invention to provide an apparatus that simulates realistic steering feel in a remote vehicle controller.

Another object of this invention is to provide bidirectional torsional resistance to a rotating member.

Yet another object of this invention is to provide bidirectional torsional resistance to a rotating member as well as to provide a center return function to permit a rotated member to return to a centered orientation.

A further object of this invention is to provide bidirectional torsional resistance and a center return function to a rotating member in a device of compact size and simple design.

Yet a further object of this invention is to provide bidirectional torsional resistance and a center return function to a rotating member in a device that is easily adjusted to vary torsional resistance and rotational range and that is easily maintained.

Other objects, advantages and new features of the invention will become apparent from the following detailed description of the invention when considered in conjunction with the accompanied drawings.

BRIEF DESCRIPTION OF THE DRAWINGS

FIG. 5 shows a top view of the invention.

FIG. 6 is a longitudinal cross-section of the invention taken from the viewing plane illustrated in FIG. 5.

FIG. 7 shows a torque versus torsion angle profile for one and two elastic couplings as may be utilized in the invention.

DESCRIPTION OF THE PREFERRED EMBODIMENT

Figure 1:
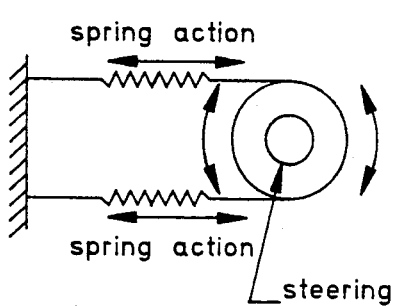
FIG. 1 is a diagrammatic representation of a prior art steering system utilizing spring action to provide torsional resistance and center return.
Figure 2:
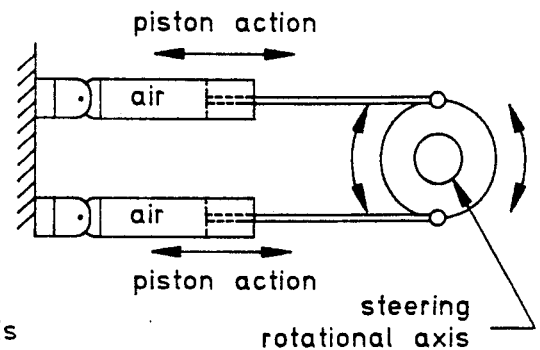
FIG. 2 is an example of another prior art steering system in which air-filled pistons are used to provide torsional resistance and centering functions.
Figure 3:
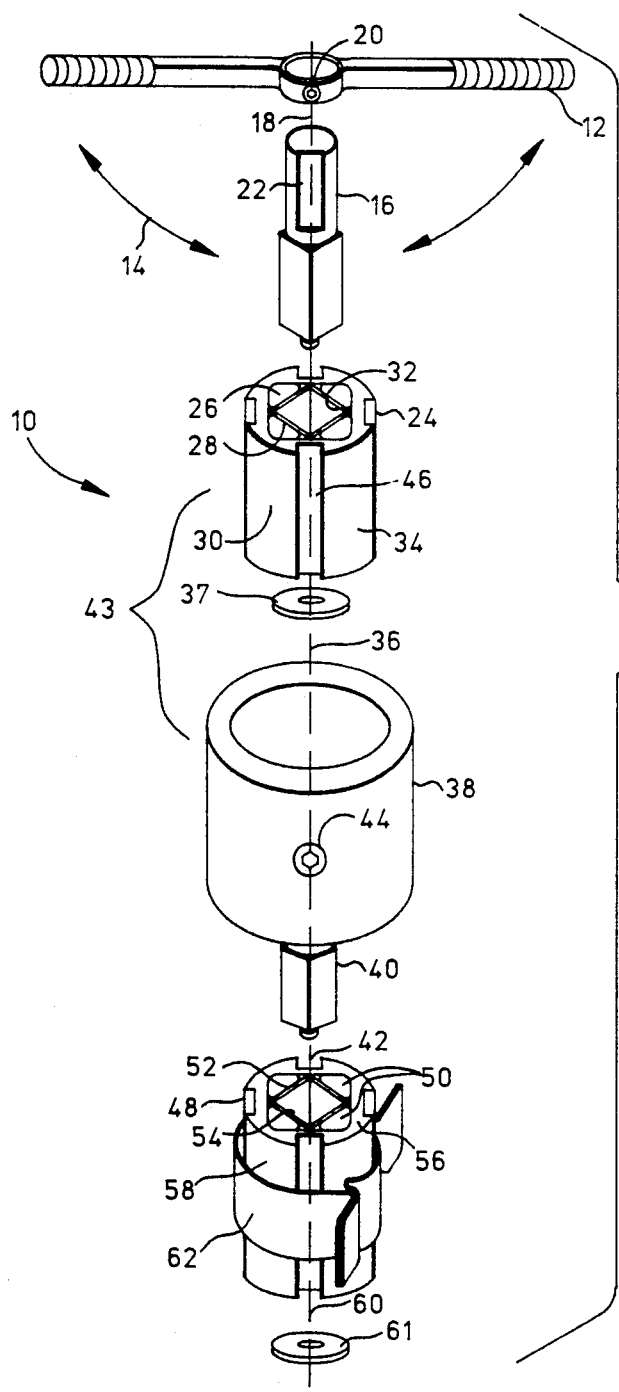
FIG. 3 shows an exploded version of one embodiment of the invention.

Referring to FIG. 3 a representative embodiment of the invention is shown as may be used in a specific implementation of the invention. As previously recited, this specific implementation, that of using the invention in a remote control steering system, is only one of many possible uses of the invention.

Referring again to FIG. 3, assembly 10 includes a grasp 12 through which an operator may induce a rotary steering motion 14. Though grasp 12 is shown as a straight bar, a variety of steering handles may be used in assembly 10. For example, grasp 12 may take the shape of a conventional steering wheel. A steering column 16, having a column axis 18, is attached to grasp 12 by conventional means such as set screw 20 and shaft flat 22.

Assembly 10 also includes a first rotatable elastic coupling 24. An example of an elastic coupling that may be utilized with the invention is manufactured by a Swiss company under the trademark LOVEJOY-ROSTA. This rubber suspension unit or elastic coupling carries the identifier DK-S11X30 and has been designed for the applications of tensioning, suspension and vibration absorption.

The specific example of coupling 24 shown includes four pre-stressed elastomeric (rubber) inserts 26, a square metallic core 28 and a grooved exterior housing 30. Coupling 24 is designed so that square core 28, including its interior surface 32, rotates with respect to exterior surface 34 of housing 30 along a coupling axis 36. Steering column 16 is inserted within coupling 24 to engage interior surface 32 of the coupling. The column is held within the coupling by a conventional fastening technique such as by a locking snap ring 37 fastened to column 16 once the column is in place.

Coupling 24 permits motions of oscillation to be transmitted between its housing 30 and its core 28 while dampening out shock and vibration. For the commercially available couplings previously identified, a ±30° torsional range is provided. This coupling has a maximum oscillating frequency of 30 cycles per minute. Higher oscillation frequencies are possible but this will require a reduction in the angle of oscillation.

In the application of the invention, elastic coupling 24 is used as a torsion spring. The commercially available elastic coupling described has a progressive spring characteristic and comes in a variety of torque ratings. For these couplings, the load or resistance to rotary motion increases as the torsion range increases. This load is identical in the plus or minus torsion rotation direction. To enable the rotary range of assembly 10 to be doubled from ±30° to ±60°, for example, and to increase its usable torque range, a plurality of elastic couplings such as coupling 24 may be interconnected in series.

This is done in a preferred embodiment of the invention by utilizing a steering column extension 38 having an extension shaft 40. Extension shaft 40 has an extension shaft axis 42 about which shaft 40 may be rotated. Steering column extension 38 permits a second rotatable elastic coupling to be used.

As can be seen in FIG. 7 a second elastic coupling enhances the rotational range of grasp 20 as well as increases the torsional resistance or torque of the overall assembly.

As is apparent from FIG. 3 it is possible to further increase the rotational angle and torsional resistance of assembly 10 by adding additional elastic couplings and column extensions to the assembly. For example, a plurality of two or more coupling pairs 43 such as those made up of elastic coupling 24 and steering column 38 could be assembled in series so as to give assembly 10 desired torsional and rotational characteristics.

As can be seen in FIG. 3 each steering column extension of a coupling pair 43, including the extension and an elastic coupling, will be rigidly attached to the exterior surface of the elastic coupling by an appropriate attachment method. For example, steering column extension 38 is rigidly attached to exterior surface 34 of elastic coupling 24 by way of set screw 44 and lateral groove 46.

At the end of an individual coupling pair or series of coupling pairs will be a last individual elastic coupling such as coupling 48 shown in FIG. 3. Like coupling 24, coupling 48 has rubber inserts 50 and a square metallic core 52 with an interior surface 54. Elastic coupling 48 likewise has an exterior housing 56 including exterior surface 58.

When fully assembled extension shaft 40 of steering column extension 38 engages interior surface 54 of core 52 so that extension shaft axis 42 is substantially aligned with coupling axis 60 of elastic coupling 48. Shaft 40 is held within the coupling by a conventional fastening technique such as by a locking snap ring 61 fastened to shaft 40 once the shaft is placed within coupling 48. A mount 62, such as that marketed by LOVEJOY-ROSTA under the identification of BK11, is utilized to grip exterior surface 58 of coupling 48. This mount is then attached to any surface that will be stationary relative to the rotational movement of grasp 12.

Figure 4:
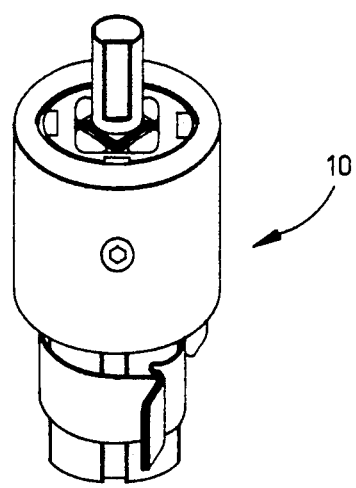
FIG. 4 is an assembled view of one embodiment of the invention.

In FIG. 4 an assembled view of assembly 10 is shown without grasp 12. When utilized with the commercially available elastic couplings described above, assembly 10 will have dimensions of approximately one and one-half inches in diameter and three inches in height. This compact size permits the torsional device of the invention to be utilized in a wide variety of applications.

Referring now to FIG. 5 there is shown a top view of assembly 10 in which the assembly has been rigidly mounted to a surface mount 64 by way of conventional fasteners 66. FIG. 6 is a cross-sectional view taken from the view angle depicted in FIG. 5.

Referring now to FIGS. 3 and 7, as grasp 12 of assembly 10 is rotated in either a clockwise or counterclockwise direction the torsional resistance to such rotational movement progressively increases. This has the effect of providing the operator of assembly 10 with a simulated realistic steering feel. As an operator relaxes the rotational force he applies to grasp 12 the torsional resistance of assembly 10 will return the grasp back to a "centered" orientation.

As previously explained a plurality of elastic couplings could be used in the invention to greatly increase the rotational range of the torsional device. For the commercially available elastic couplings described, each additional coupling would increase the invention's rotational range by ±30°.

A further embodiment of the invention could use a multiple stage concept. In addition to using a plurality of elastic couplings, couplings of different characteristics could be mixed together to produce "stepped" torsional resistance. For example, if a three foot-pound elastic coupling was coupled to a six foot-pound coupling, it would be easy to rotate an attached steering grasps in the −30° to +30° range but much more difficult in the −30° to −60° and +30° to +60° range.

As another embodiment of the invention, the elastic couplings could be mounted in various configurations, for example horizontally versus vertically. Such arrangements could provide a variety of overall height and profiles of the device. Of course a series of gears may be required to translate rotation of the device from a horizontal axis to a vertical axis and vice versa.

As mentioned in the summary of the invention numerous applications exist requiring a torsional resistance and an automatic center return feature. Candidates for this device include, for example, joy sticks, video game controllers, exercise machines, door swing and return applications, as well as electrical/mechanical control knobs.

Obviously many modifications and variations of the invention are possible in light of the above teachings. It is therefore to be understood that within the scope of the appended claims the invention may be practiced otherwise than has been specifically described.

What is claimed is:

1. An apparatus for simulating realistic steering feel in a rotatable grasp of a vehicle remote control comprising:
   a steering column attached to said grasp and having a column axis around which said steering column rotates;
   a coupling having a coupling axis around which an interior surface of said coupling elastically rotates with respect to an exterior surface of said coupling, said steering column being engaged with said interior surface of said coupling so that said column axis and said coupling axis are substantially aligned; and
   a mount rigidly coupled to said exterior surface of said coupling and to a surface that is stationary relative to said grasp when said grasp is rotated.

2. An apparatus for simulating realistic steering feel in a remote control steering system comprising:
   a grasp;
   a steering column coupled to said grasp having a column axis around which said steering column rotates, said column axis being substantially orthogonal to any rotary steering motion imparted to said grasp;
   a coupling having a coupling axis around which an interior surface of said coupling elastically rotates with respect to an exterior surface of said coupling, said steering column being engaged with said interior surface of said coupling so that said column axis and said coupling axis are substantially aligned; and
   a mount rigidly coupled to said exterior surface of said coupling and to a surface that is stationary relative to said grasp when said grasp is rotated.

3. An apparatus for simulating realistic steering feel in a remote control steering system comprising:
   a grasp;
   a steering column coupled to said grasp having a column axis around which said steering column rotates, said column axis being substantially orthogonal to any rotary steering motion imparted to said grasp;
   a first rotatable elastic coupling having a coupling axis around which an interior surface of said first coupling elasticaly rotates with respect to an exterior surface of said first coupling, said steering column being engaged with said interior surface of said coupling so that said column axis and said coupling axis of said first rotatable elastic coupling are substantially aligned;
   a steering column extension including an extension shaft having an extension shaft axis, said column extension being rigidly coupled to said exterior surface of said first elastic coupling so that said extension shaft axis is substantially aligned with said coupling axis of said first rotatable elastic coupling;
   a second rotatable elastic coupling having a coupling axis around which an interior surface of said second coupling elastically rotates with respect to an exterior surface of said second coupling, said extension shaft of said steering column extension being engaged with said interior surface of said second coupling so that said extension shaft axis and said coupling axis of said second coupling are substantially aligned; and
   a mount rigidly coupled to said exterior surface of said second elastic coupling and to a surface that is stationary relative to said grasp when said grasp is rotated.

4. An apparatus for simulating realistic steering feel in a remote control steering system comprising:
   a grasp;
   a steering column coupled to said grasp having a column axis around which said steering column rotates, said column axis being substantially orthogonal to any rotary steering motion imparted to said grasp; and
   rotationally elastic means attached to said steering column and a surface that is stationary relative to grasp when said grasp is rotated, said rotationally elastic means for providing increasing torsional resistance to said rotary steering motion as said grasp is rotated from a centered position.

5. An apparatus according to claim 4 in which said rotationally elastic means includes:
   a coupling having a coupling axis around which an interior surface of said coupling elastically rotates with respect to an exterior surface of said coupling, said steering column being engaged with said interior surface of said coupling so that said column axis and said coupling axis are substantially aligned; and
   a mount rigidly coupled to said exterior surface of said coupling and to a surface that is stationary relative to said grasp when said grasp is rotated.

6. An apparatus according to claim 4 in which said rotationally elastic means includes:
   a first rotatable elastic coupling having a coupling axis around which an interior surface of said first coupling elasticaly rotates with respect to an exterior surface of said first coupling, said steering column being engaged with said interior surface of said coupling so that said column axis and said coupling axis of said first rotatable elastic coupling are substantially aligned;
   a steering column extension including an extension shaft having an extension shaft axis, said column extension being rigidly coupled to said exterior surface of said first elastic coupling so that said extension shaft axis is substantially aligned with said coupling axis of said first rotatable elastic coupling;
   a second rotatable elastic coupling having a coupling axis around which an interior surface of said second coupling elastically rotates with respect to an exterior surface of said second coupling, said extension shaft of said steering column extension being engaged with said interior surface of said second coupling so that said extension shaft axis and said coupling axis of said second coupling are substantially aligned; and
   a mount rigidly coupled to said exterior surface of said second elastic coupling and to a surface that is stationary relative to said grasp when said grasp is rotated.

7. An apparatus for simulating realistic steering feel in a remote control steering system comprising:

a steering column attached to a grasp and having a column axis around which said steering column rotates;

n, a whole number, coupling pairs each having a rotatable elastic coupling with a steering column extension attached thereto, in which each of said rotatable elastic couplings has a coupling axis around which an interior surface of said coupling elastically rotates with respect to an exterior surface of said coupling, and in which each of said steering column extensions includes an extension shaft having an extension shaft axis, said column extension being rigidly coupled to said exterior surface of said rotatable elastic coupling that is a part of a single coupling pair of said n pairs so that said extension shaft axis is substantially aligned with said coupling axis of said rotatable elastic coupling of said single pair;

said steering column being engaged with said interior surface of a first rotatable elastic coupling of said n coupling pairs so that said column axis and said coupling axis of said first rotatable elastic coupling are substantially aligned;

a last individual rotatable elastic coupling having a coupling axis around which an interior surface of said second coupling elastically rotates with respect to an exterior surface of said second coupling, said extension shaft of said steering column extension of said nth coupling pair being engaged with said interior surface of said last individual coupling so that said extension shaft axis of said steering column extension of said nth coupling pair and said coupling axis of said last individual coupling are substantially aligned; and a mount rigidly coupled to said exterior surface of said last individual elastic coupling and to a surface that is stationary relative to said grasp when said grasp is rotated.

* * * * *